(12) United States Patent
Giuliani

(10) Patent No.: US 7,909,157 B2
(45) Date of Patent: Mar. 22, 2011

(54) MACHINE AND METHOD FOR FORMING GROUPS OF PRODUCTS ORDERED IN SUPERPOSED LAYERS

(75) Inventor: Nicola Giuliani, Bologna (IT)

(73) Assignee: KPL Packaging S.p.A., Bologna (IT)

( * ) Notice: Subject to any disclaimer, the term of this patent is extended or adjusted under 35 U.S.C. 154(b) by 257 days.

(21) Appl. No.: 12/308,397

(22) PCT Filed: Jun. 4, 2007

(86) PCT No.: PCT/IT2007/000392
§ 371 (c)(1),
(2), (4) Date: Jan. 14, 2009

(87) PCT Pub. No.: WO2007/144921
PCT Pub. Date: Dec. 21, 2007

(65) Prior Publication Data
US 2010/0230238 A1 Sep. 16, 2010

(30) Foreign Application Priority Data
Jun. 16, 2006 (IT) ................. FI2006A0151

(51) Int. Cl.
*B65G 47/30* (2006.01)
(52) U.S. Cl. .................. 198/418.4; 198/427; 198/418.9; 414/791; 414/791.1
(58) Field of Classification Search ............... 198/418.4, 198/418.9, 426, 427, 431, 432, 435; 414/791, 414/791.1, 794.7
See application file for complete search history.

(56) References Cited

U.S. PATENT DOCUMENTS

| 2,917,991 | A | * | 12/1959 | Segur ........................... 414/791 |
| 4,450,949 | A | * | 5/1984 | Buschor et al. ............ 198/418.4 |
| 5,092,448 | A | * | 3/1992 | Cinotti ....................... 198/418.4 |
| 5,100,124 | A | * | 3/1992 | Pouliquen .................. 198/418.9 |
| 5,961,274 | A | * | 10/1999 | Bors ............................ 414/791 |
| 6,659,710 | B2 | * | 12/2003 | Gamberini ................ 414/794.7 |
| 6,851,919 | B2 | * | 2/2005 | Cinotti et al. .............. 414/794.5 |
| 7,547,184 | B2 | * | 6/2009 | Dall'Omo et al. ........... 414/791 |
| 7,703,264 | B2 | * | 4/2010 | Giuliani ........................ 198/415 |
| 2005/0097865 | A1 | | 5/2005 | Gamberini |

FOREIGN PATENT DOCUMENTS

| EP | 0 654 429 A1 | 5/1995 |
| EP | 1 535 844 A1 | 6/2005 |
| EP | 1 775 222 A1 | 4/2007 |
| WO | WO 98/09894 A1 | 3/1998 |
| WO | WO 2005/080206 A1 | 9/2005 |

* cited by examiner

*Primary Examiner* — James R Bidwell
(74) *Attorney, Agent, or Firm* — Breiner & Breiner, LLC

(57) ABSTRACT

There is described a machine for forming groups of ordered products, each group including products disposed according to superposed layers. The machine includes a succession of conveyors aligned according to a principal direction of alignment, with a feed conveyor and a delivery conveyor. The feed conveyor receives single layers of products aligned with and spaced from one another; and the conveyors are disposed and controlled so as to distribute layers of products on a predetermined number of levels at different heights, and to unload onto the delivery conveyor a predetermined number of layers, superposed on one another, equal to the predetermined number of the levels at different heights.

20 Claims, 12 Drawing Sheets

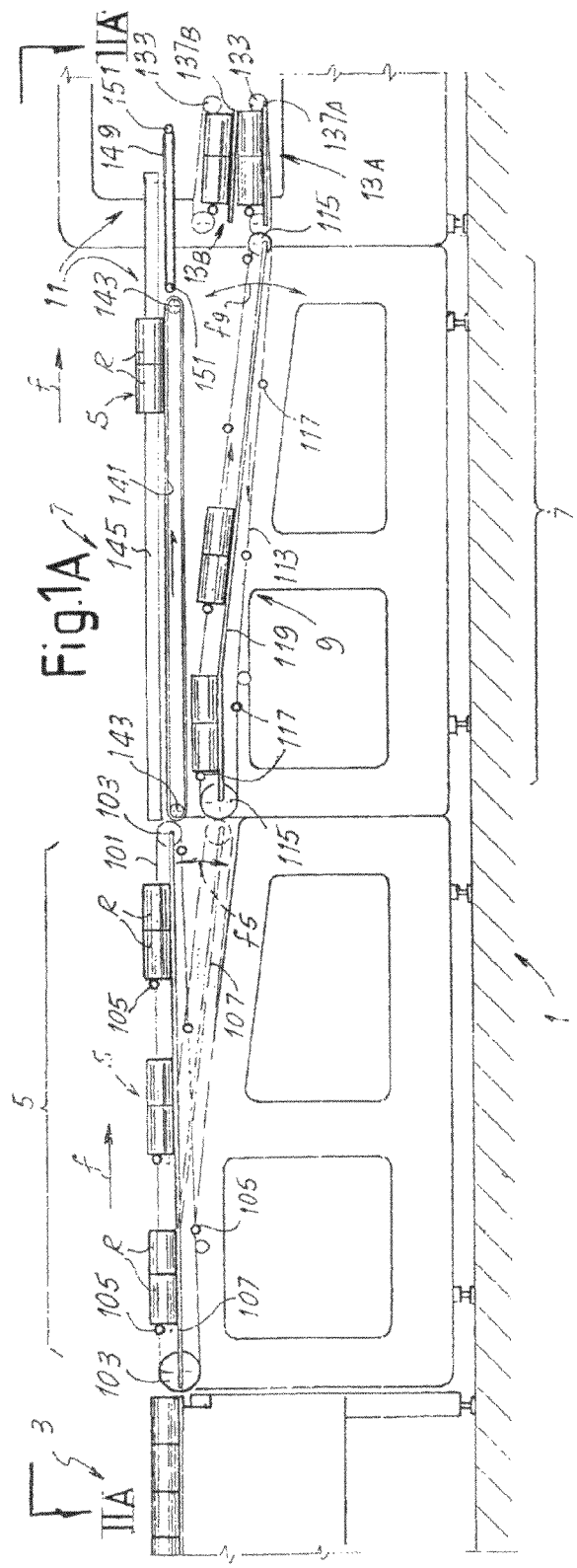

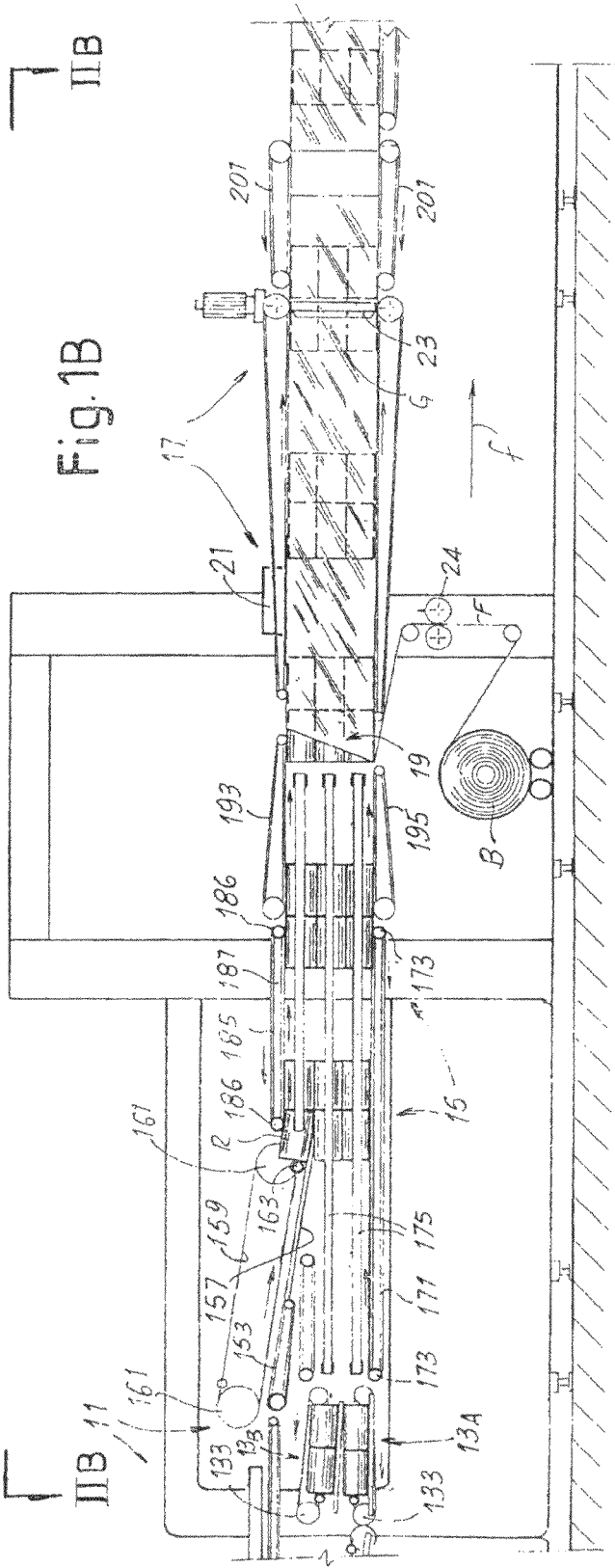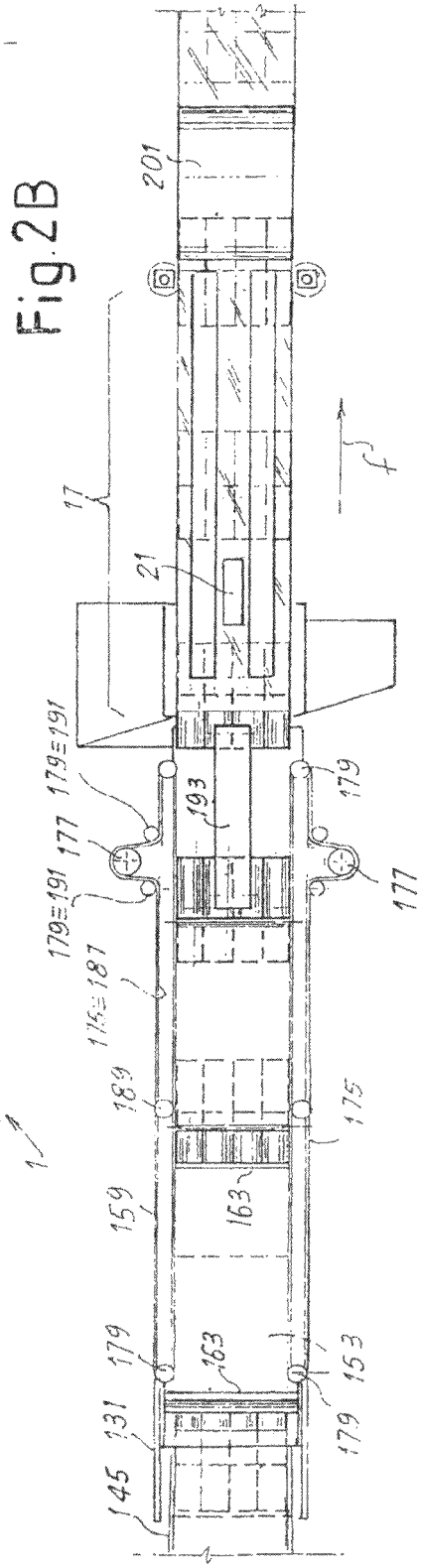

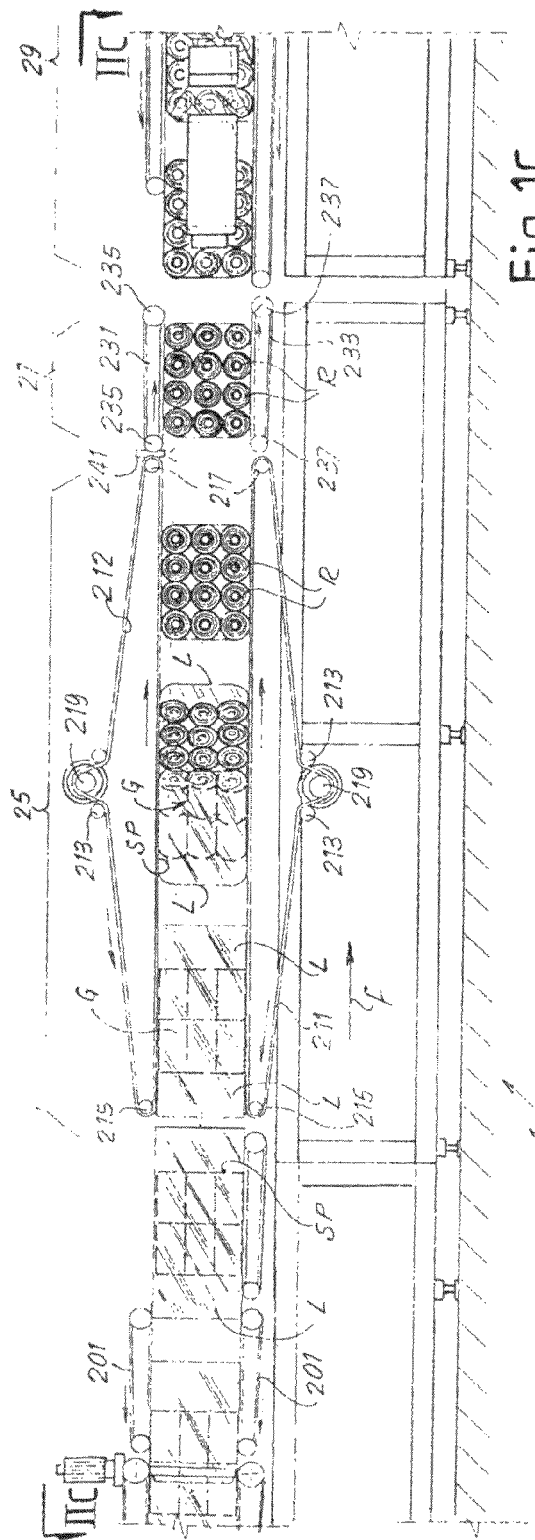
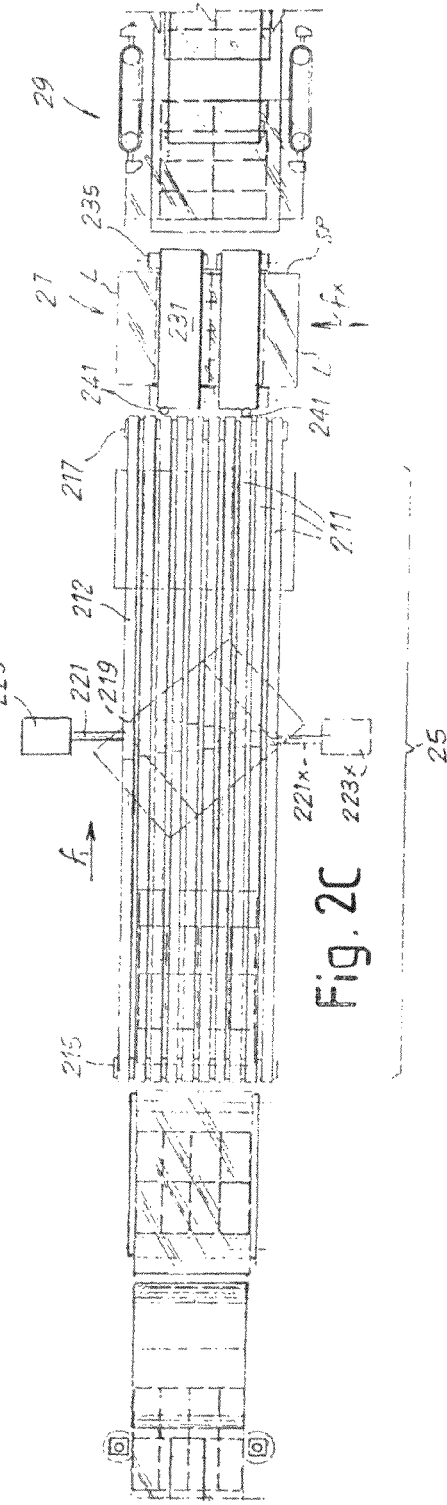

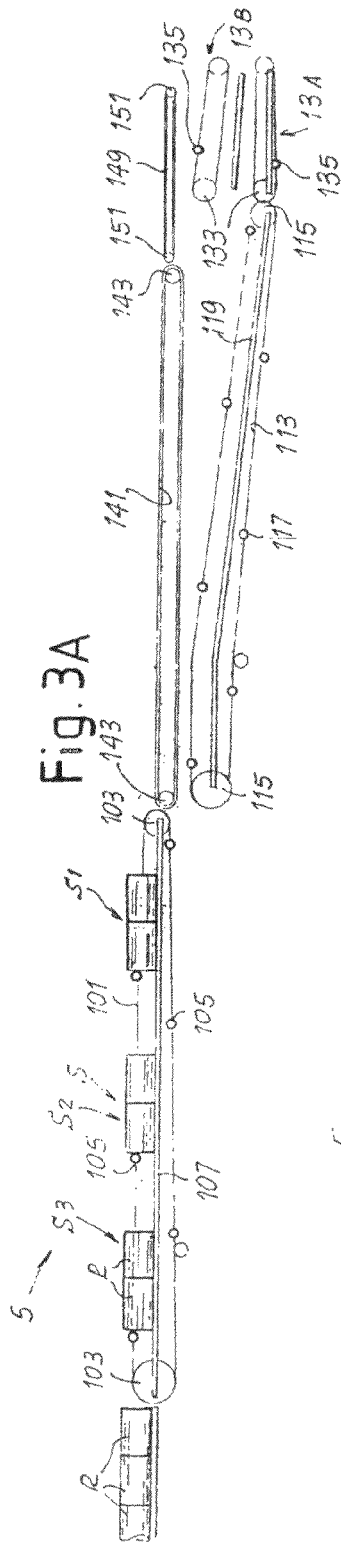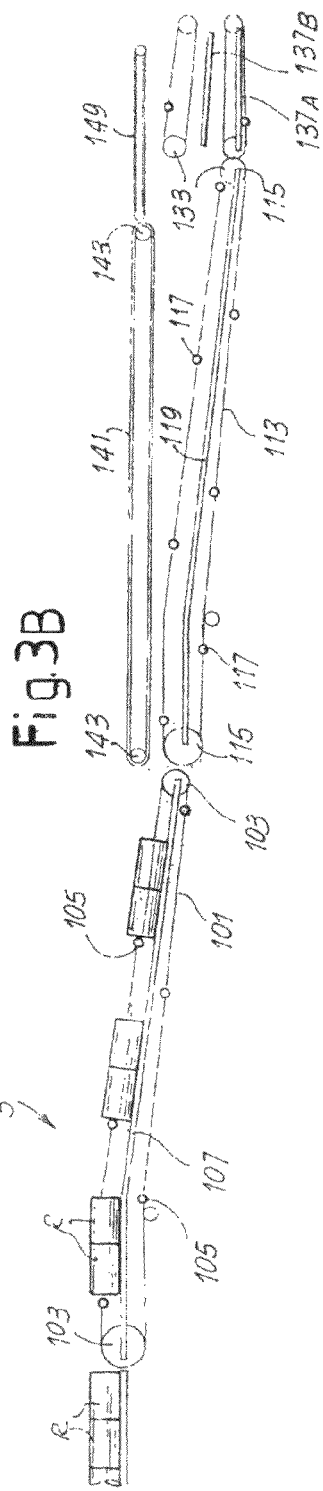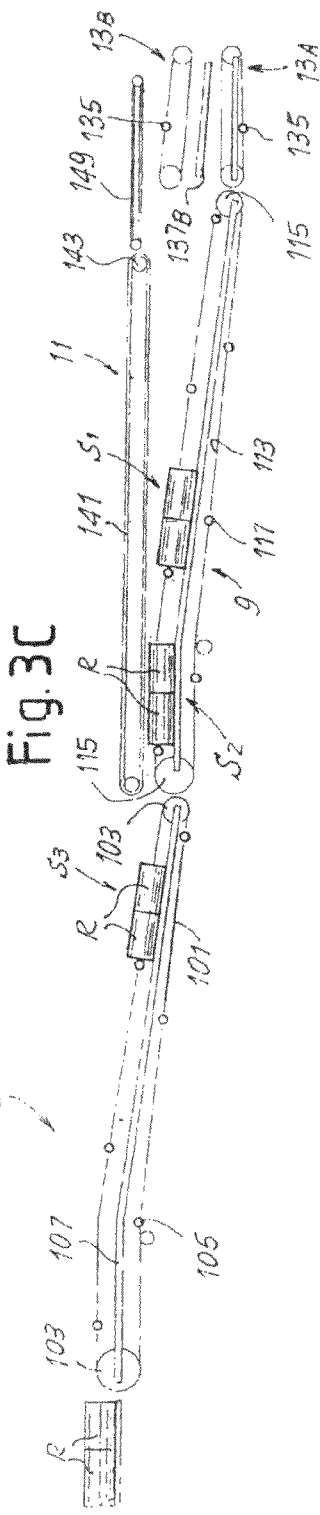

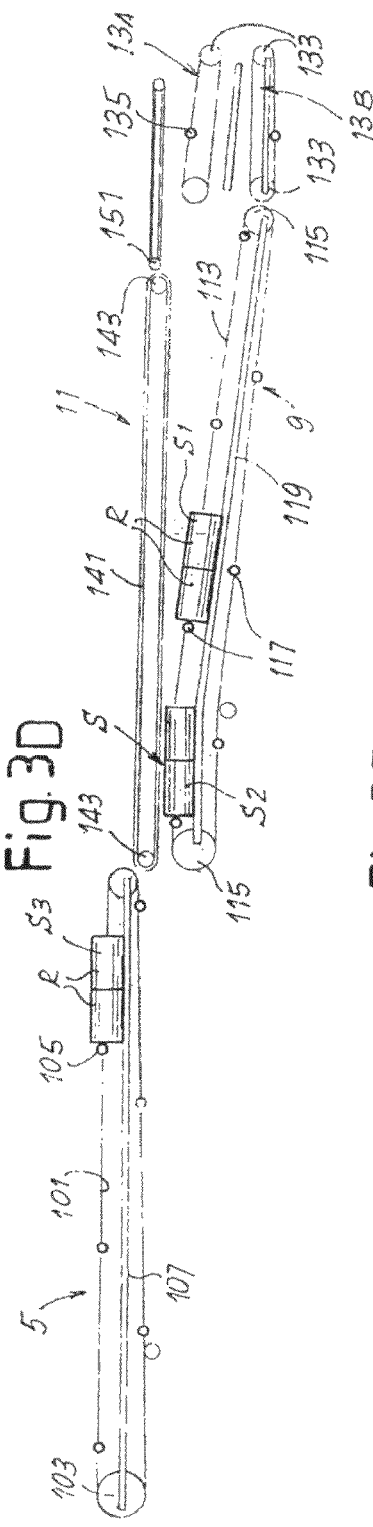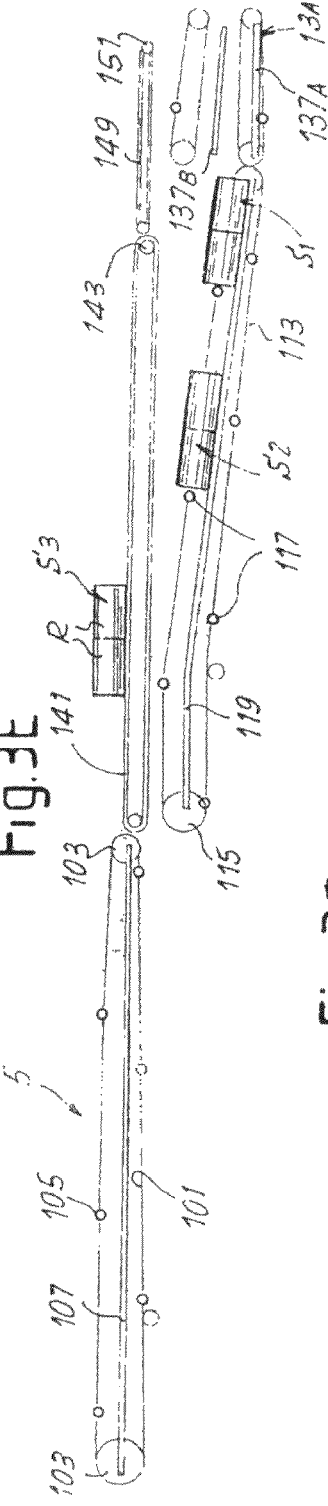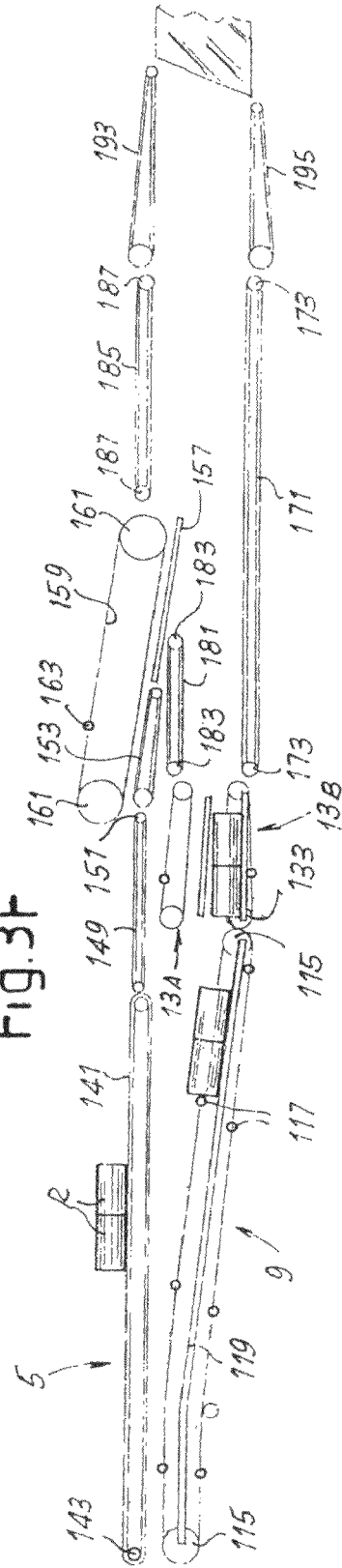

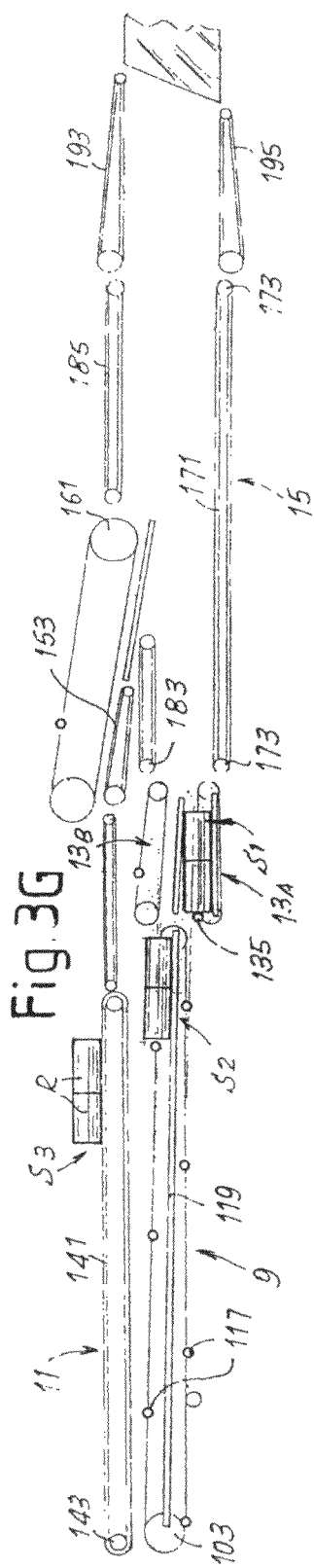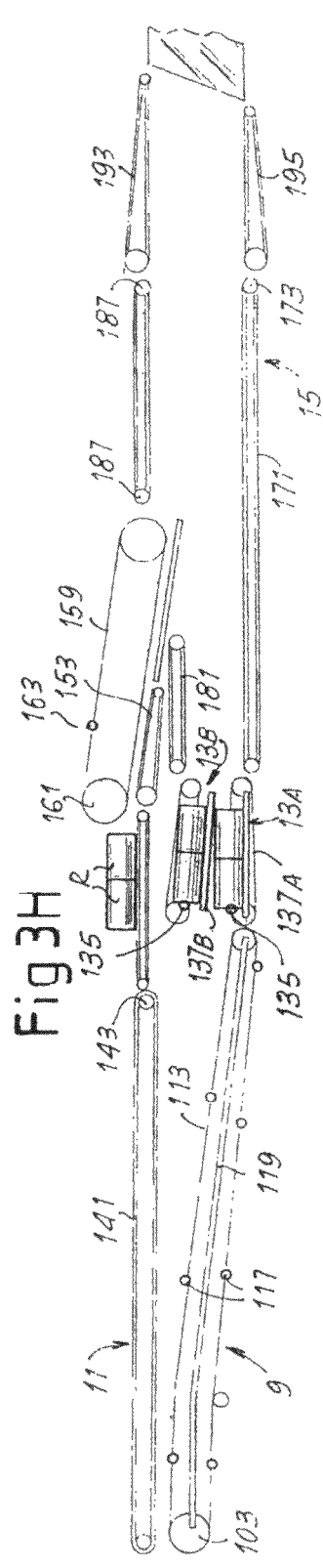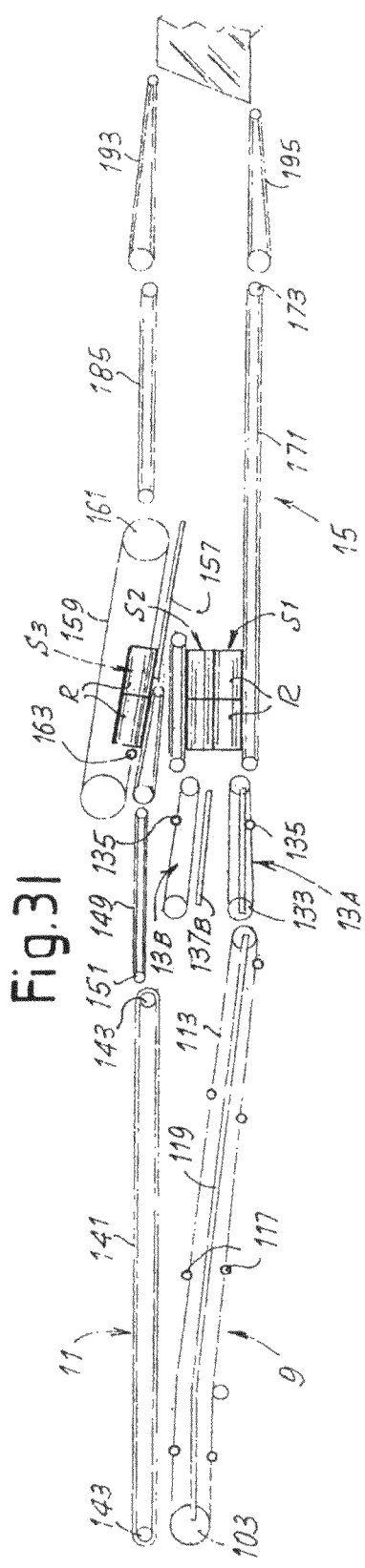

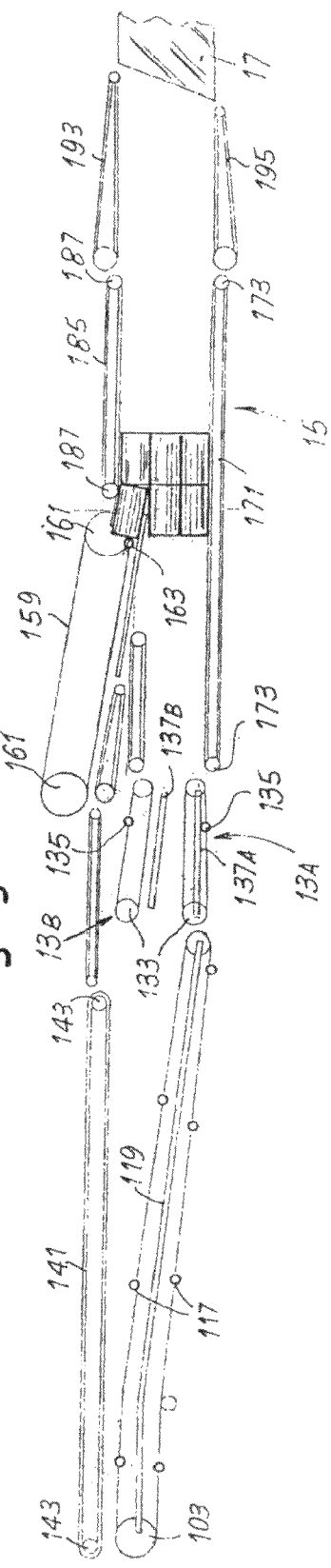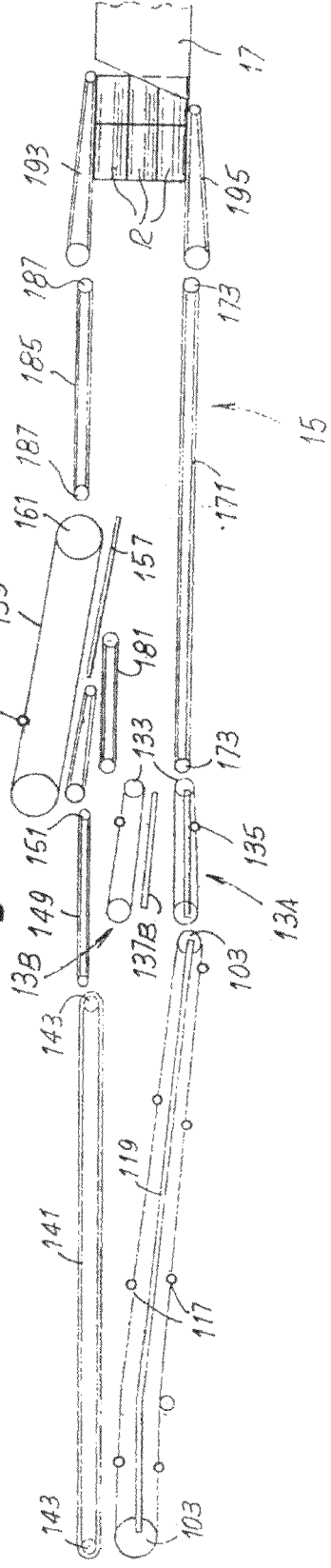

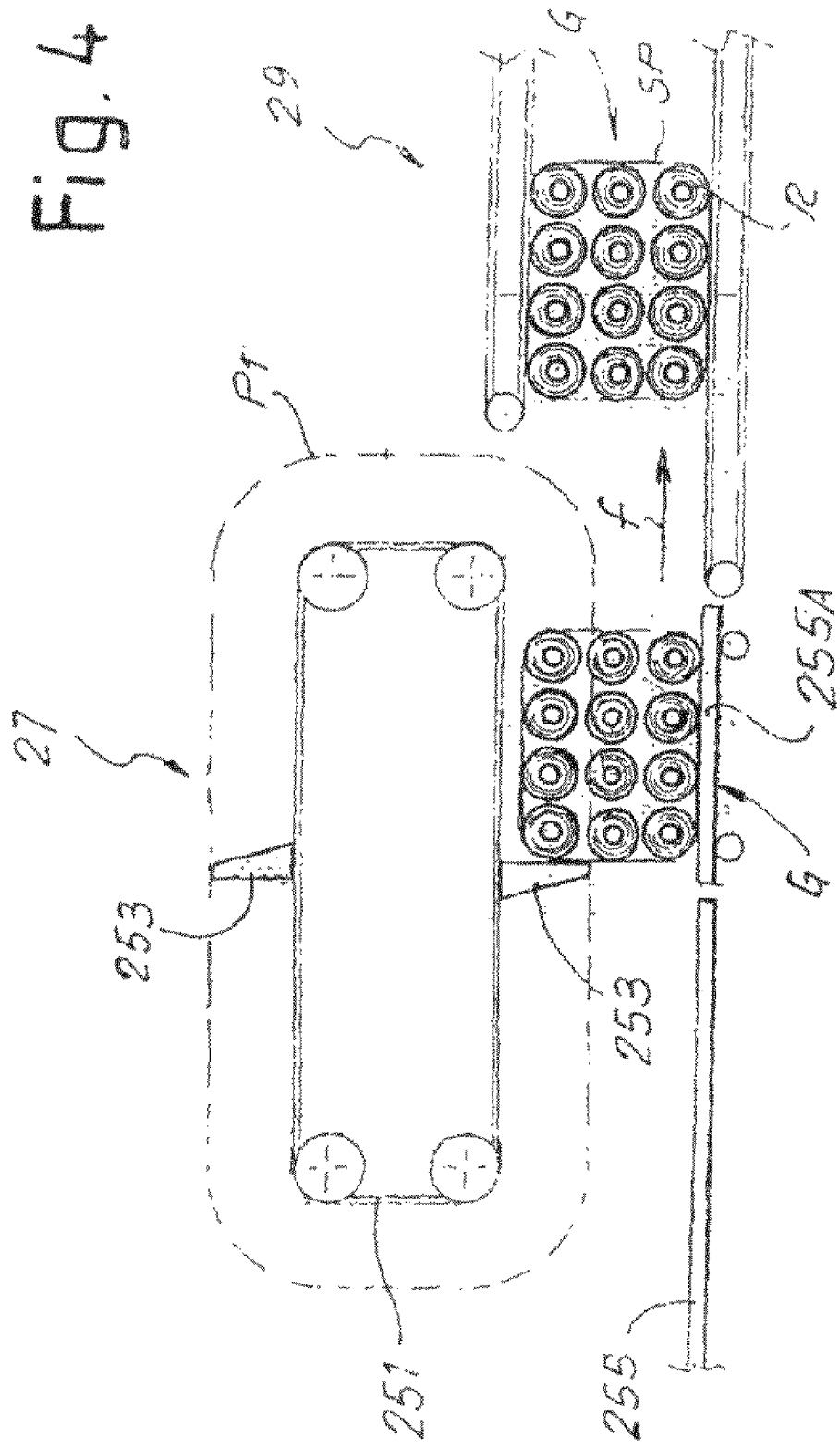

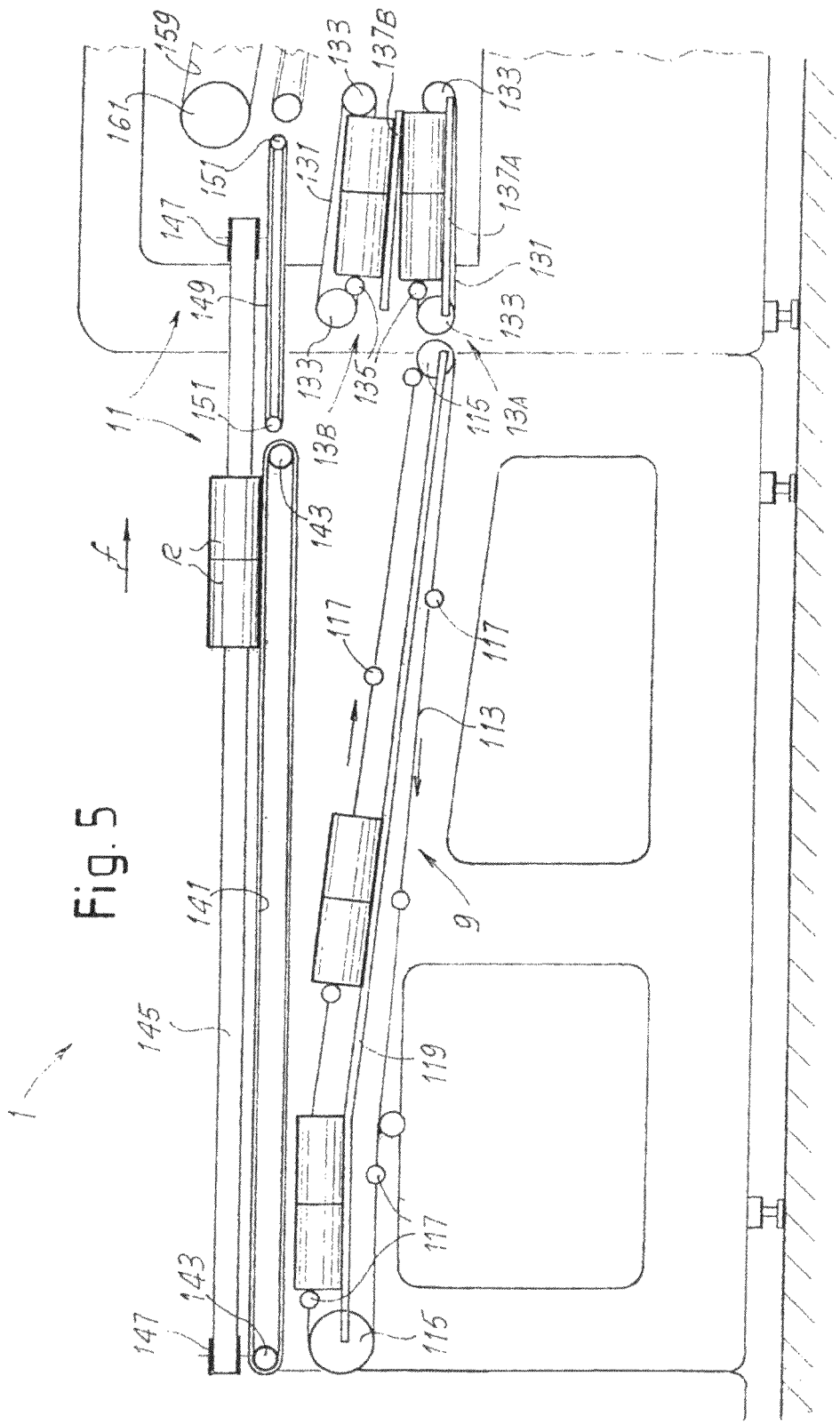

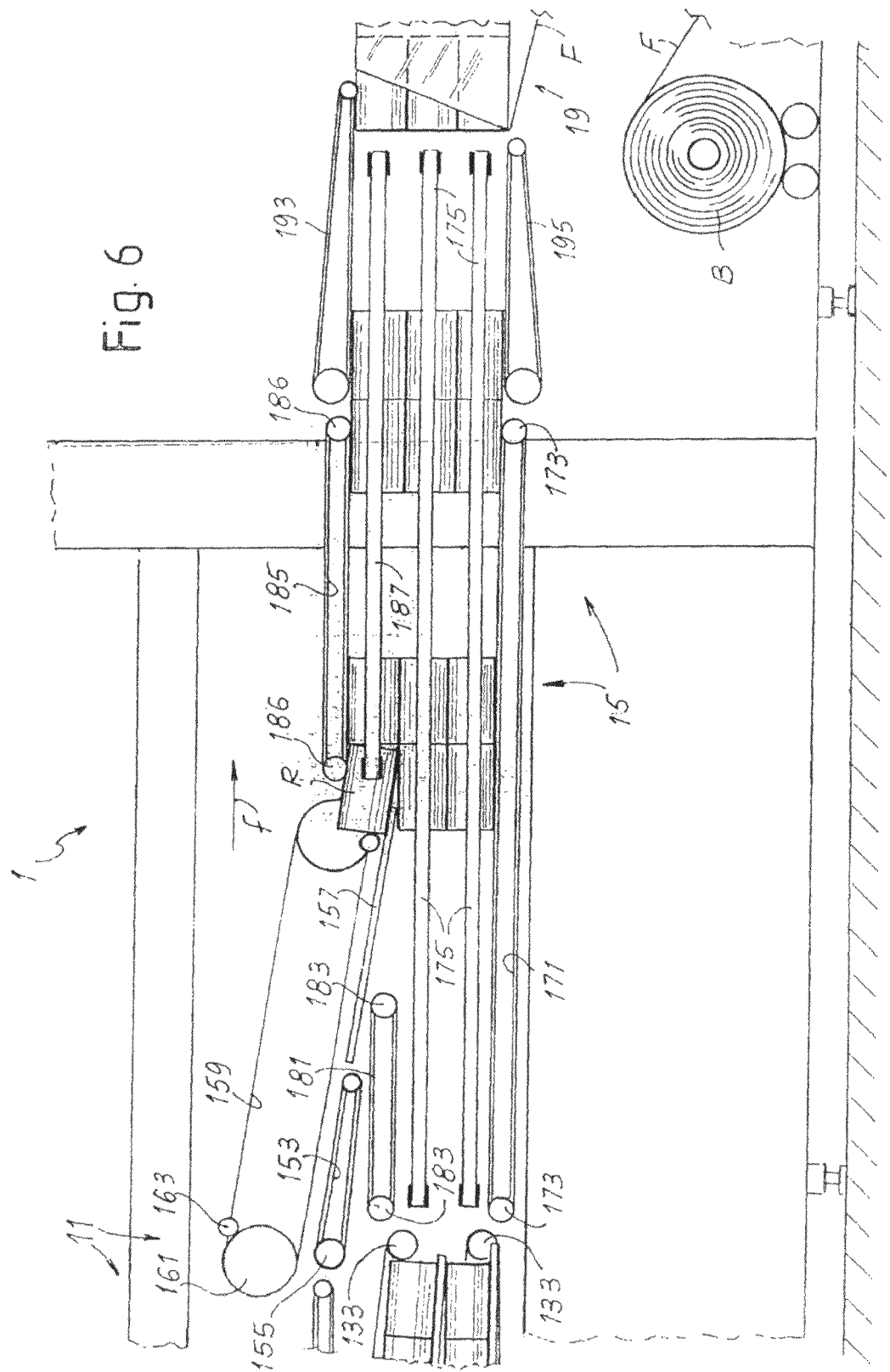

MACHINE AND METHOD FOR FORMING GROUPS OF PRODUCTS ORDERED IN SUPERPOSED LAYERS

TECHNICAL FIELD

The present invention relates to improvements to methods and machines for forming groups of products ordered according to a predetermined number of superposed layers.

More specifically, although not exclusively, the invention can be applied with particular advantages to methods and machines for forming groups of rolls of paper, especially tissue paper such as toilet paper, kitchen paper or the like, to be packaged with plastic film.

STATE OF THE ART

In packaging of some types of products, in particular rolls of tissue paper, it is necessary to superpose a certain number of layers, each formed by individual products arranged in a side-by-side arrangement. To perform this operation there are known particularly complex machines which have various configurations according to the number of superposed layers to be produced. One of the problems that occur in designing these machines is represented by the need to reach high speeds.

EP-A-654429 describes a system to produce groups of products each comprising a pair of superposed layers. For this purpose a conveyor is provided on which single layers of product, spaced from one another, are disposed and downstream of said conveyor there is provided a second swinging conveyor, which oscillates about a substantially horizontal axis, to feed single layers on two distinct superposed levels. Associated with each of said levels is a further conveyor that feeds pairs of superposed layers which are loaded, one on top of the other, on an elevator platform. Said platform transfers the pairs of superposed layers to the packaging machine.

US-A-2005/0097865 describes a device capable of producing packs of layered products, which can be used in particular to package rolls of tissue paper. The machine is characterized by a particularly complex structure.

A further problem encountered in the design of packaging machines is represented by the need to use elevator platforms, which on the one hand slow down the production rate and on the other make the packaging line more complex.

OBJECTS AND SUMMARY OF THE INVENTION

An object of the present invention is to provide a method and a machine that allow forming of groups of products ordered according to superposed layers, which overcome entirely or in part the drawbacks of prior art machines and methods.

An object of a particular embodiment of the invention is to provide a machine and a method that allow superposing of layers of products without the need to use elevator platforms and, if possible, without the need to modify the overall direction of feed of the single layers.

According to a further aspect, an object of a preferred embodiment of the invention is to provide a machine and a method that allow groups with a variable number of superposed layers to be produced in a flexible manner.

In substance, according to a first aspect, the invention provides for a method for forming groups of products ordered according to a predetermined number of superposed layers, comprising the steps of:

dividing a flow of products into single layers aligned with and spaced from one another on a first conveyor;

feeding on different levels the layers coming from the first conveyor, said different levels being of the same number as the predetermined number of superposed layers in said group, said number being preferably more than two, for example three;

superposing on one another a set of layers coming from different levels.

When the number of layers is more than two, the method provides for feeding a first set of layers, formed for example of two layers, and disposing thereon at least a further set of layers, to form said group of superposed layers.

In practice, the method of the present invention provides for feeding on superposed levels two or more layers of products and stacking them on top of one another while they are fed along a principal direction of feed. This direction of feed can in practice be represented by a path for the various layers which in a plan view, extends along a substantially straight line.

A particularly advantageous embodiment of the method according to the invention provides for stacking of the single layers, for example two or preferably three or more layers, by feeding single layers along a principal direction of feed in a substantially continuous manner, without the need to accumulate layers on an elevator platform, as occurs in conventional systems for producing multilayer packs.

With this method it is possible to create packs of three layers of product by feeding the layers, initially distributed on a feed conveyor, along paths on superposed levels, then positioning the single layers on top of one another while they are fed along a principal direction of feed. For example, there can be formed a first set of layers comprising two layers, which is formed in a position upstream along the direction of feed and on which there is superposed or below which there is positioned a further set of layers comprising a single layer.

Reciprocal superposing of the two sets of layers can take place without stopping the layers, but while they are being fed along a path of feed and along a position of reciprocal superposing, substantially without stopping, by reciprocally synchronizing the movement of one of said sets of layers with respect to the other. Preferably, for this purpose there is provided a synchronizing conveyor, which can for example and preferably be the one on which the set comprising the smaller number of layers, for example a single layer, is fed. This can be accelerated or decelerated with respect to the other sets of layers so that sets of layers to be superposed reach, in a substantially simultaneous manner and substantially at the same speed, the position in which reciprocal superposing, i.e. stacking of one set of layers on the other, shall take place.

According to a possible embodiment, the first set of layers is formed below the level on which the further set of layers is fed; the first set of layers and the further set of layers are fed, according to a direction of feed, along superposed paths; and therefore the further set of layers is disposed above the first set of layers in a position downstream, with respect to the direction of feed, of the position where the first set of layers are formed.

According to a practical embodiment, the single layers are spaced apart on the first conveyor with a substantially constant distance and are preferably fed in a substantially continuous manner on said first conveyor. According to a possible embodiment of the invention, the layers are fed according to a principal direction of feed from the first conveyor to an area in which said layers have been superposed to form said groups of products. Along the direction of feed, there can also be disposed the assembly of mechanisms that perform packaging by means of a sheet of plastic film or the like. In this way a packaging line with substantially rectilinear extension in the plane is obtained, with considerable reduction in dimensions and simplification of the plant layout.

In an advantageous embodiment, the method provides for the steps of:

- feeding in sequence single layers of products spaced from one another along said first conveyor;
- feeding a first series of layers to a first level and a second series of layers to a second level, said levels being substantially superposed on each other;
- feeding said first series of layers and said second series of layers along substantially superposed paths;
- dividing said first series of layers into two sub-series of layers and feeding said two sub-series of layers to two distinct levels substantially superposed on each other;
- positioning said two sub-series of layers and said second series of layers one above the other to form said group of superposed layers, feeding them in a synchronized manner along a direction of feed to an area of reciprocal superposing.

To obtain packs of three layers of products, the second series of layers, the first sub-series of layers and the second sub-series of layers can advantageously each comprise a layer of products for each group of ordered products.

A further embodiment of the method according to the present invention can provide for the steps of:

- feeding in sequence single layers of products spaced from one another along said first conveyor, which is provided with an oscillating movement about a first substantially horizontal axis, to unload a first series of layers onto a second conveyor and a second series of layers onto a third conveyor, said second and said third conveyors being substantially superposed on each other and said second conveyor being oscillating about a second substantially horizontal axis;
- by means of said second conveyor, unloading the layers of said first series of layers onto substantially superposed fourth conveyor and fifth conveyor;
- superposing on one another layers of products coming from said third conveyor, said fourth conveyor and said fifth conveyor.

In a practical embodiment the fourth and the fifth conveyors can be disposed at a lower height with respect to the third conveyor.

According to a further aspect, the invention provides for a machine for forming groups of ordered products (each of which is formed by products disposed according to superposed layers), comprising a succession of conveyors aligned according to a principal direction of alignment, with a feed conveyor and a delivery conveyor, wherein the feed conveyor receives single layers of products aligned with and spaced from one another; and wherein the conveyors are disposed and controlled so as to distribute layers of products on a predetermined number of levels at different heights, and to unload onto the delivery conveyor a predetermined number of layers, superposed on one another, equal to the predetermined number of said levels at different heights.

According to a preferred embodiment of the invention, between the feed conveyor and the delivery conveyor there is disposed a plurality of conveyors at different levels corresponding to the number of superposed layers contained in each of said groups. The conveyors are disposed to superpose on one another, in different positions along a direction of feed, a first set of layers and a further set of layers.

In a possible embodiment, the succession of conveyors comprises conveyors oscillating about substantially horizontal axes, which distribute said layers of products on a plurality of levels.

In practice, the first feed conveyor can be an oscillating conveyor, to distribute the feed layers to at least two further conveyors disposed substantially superposed on each other on two corresponding levels. According to a possible embodiment, one of the further conveyors is also oscillating, to distribute the layers of products on at least two distinct levels at which there are disposed respective substantially superposed conveyors.

According to a particular aspect of the present invention, there is provided a machine for forming groups of ordered products disposed in superposed layers, wherein: a first feed conveyor receives and feeds single layers of products spaced from one another, and is oscillating about a first substantially horizontal axis; downstream of the first conveyor there are disposed a second conveyor and a third conveyor, substantially superposed on each other and aligned with said first conveyor along a principal direction; the second conveyor and the third conveyor are disposed, with respect to the first conveyor, so as to alternately receive the layers of products fed from said first conveyor as a result of the oscillating movement about said first substantially horizontal axis. Moreover, the second conveyor is in turn oscillating about a second substantially horizontal axis; downstream of the second conveyor there are disposed a fourth conveyor and a fifth conveyor, substantially superposed on each other and aligned with said second conveyor along the principal direction of feed; the fourth conveyor and the fifth conveyor are disposed—with respect to the second conveyor—so as to alternately receive the products distributed by said second conveyor as a result of the oscillating movement about said second substantially horizontal axis; and the third, the fourth and the fifth conveyors are arranged to unload layers of product superposed on one another onto the delivery conveyor.

Advantageously, the third conveyor extends above the fourth and the fifth conveyors, so as to override the position in which a first layer of products is formed by means of the fourth and fifth conveyors. These superposed layers are then fed on a delivery conveyor to the point in which there is disposed thereon a layer of products coming from the third conveyor.

In a practical embodiment, the third conveyor extends partially above the delivery conveyor, so that the layers of products coming from said fourth and fifth conveyors are unloaded superposed on each other onto said delivery conveyor, and a third layer coming from said third conveyor is superposed on each pair of superposed layers coming from said fourth and fifth conveyors.

Hereunder the invention will be described in an application thereof to a packaging machine or line, which also comprises a section in which the group of ordered products is packed or wrapped in a plastic film. For this purpose, the line is also provided with an innovative system for orientation of the packs or groups of products formed by the assembly of conveyors forming part of the present invention. However, it must be understood that the method and the device for forming groups of superposed layers of products can also be used in a different type of line, provided with different packaging or wrapping systems to those described or even without these systems.

BRIEF DESCRIPTION OF THE DRAWINGS

The invention will be better understood by following the description and accompanying drawing, which shows a non-limiting practical example of the invention. In the drawing.

FIGS. 1A-1D show a side view of the packaging line in which the invention is incorporated. The various FIGS. 1A, 1B, 1C, 1D show successive portions of the same line which, as a whole, extends in a substantially rectilinear direction;

FIGS. 2A-2D show a plan view of the portions of line in FIGS. 1A-1D;

FIGS. 3A-3K show an operating sequence of the first portion of the line, to illustrate the manner in which a group of products in superposed layers is formed;

FIG. 4 shows a variant of embodiment of a section of the line;

FIGS. 5 and 6 show enlargements of two portions of the line; and

DETAILED DESCRIPTION OF AN EMBODIMENT OF THE INVENTION

Before describing in detail the structure of the various sections of which a packaging line according to the invention is composed, and the operation thereof, the single sections of which it is composed will be briefly illustrated.

The line, indicated as a whole with 1, comprises a first portion 3 in which conveyor is arranged, which, in the example illustrated, has five substantially parallel channels 3A, along which there are fed rows of products to be ordered into groups and packaged. The example illustrated shows rolls of tissue paper R, but it must be understood that the principles underlying the invention can be applied to lines for packaging other types of products.

Downstream of the conveyor 3 a first feed conveyor 5 is arranged, along which single layers of products are disposed spaced from one another, preferably at a constant distance. In the example shown, each layer comprises four adjacent rows of two rolls each. Associated with the conveyor 5 there are guide and baffle plates 5A that deflect, toward the median axis of said conveyor, the single rows of rolls coming from the conveyor 3. The structure of the conveyor 5, just as that of the remaining sections forming the packaging line, will be described in greater detail hereunder.

Figure 1D:
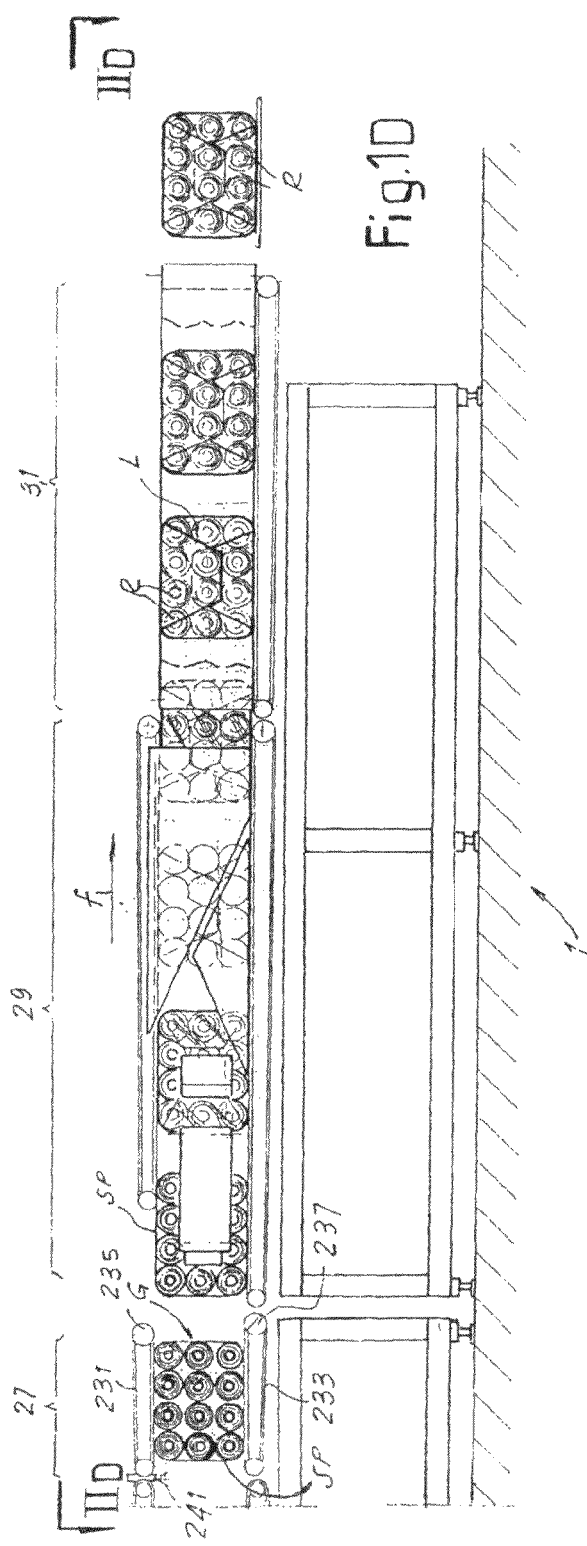
Figure 2D:
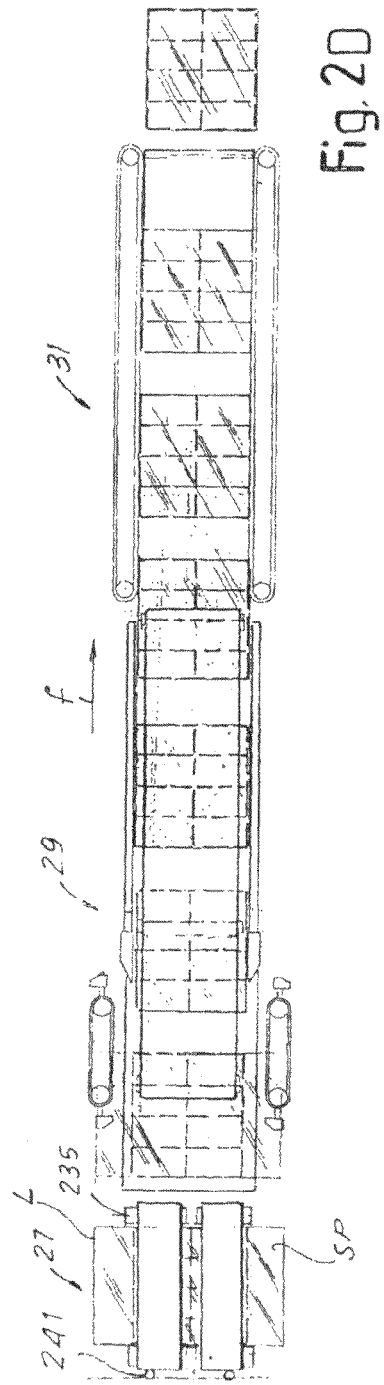

Along the feed path of the products or rolls R, which extends according to a principal direction, i.e. according to a rectilinear trend in the plan view, down-stream of the conveyor 5 there is provided a section 7 (FIGS. 1A, 2A), in which a second conveyor 9 and a third conveyor 11 are located. The two conveyors 9 and 11 are arranged at different heights, the conveyor 11 being placed above the conveyor 9. The conveyor 11 is actually formed by a plurality of single conveying elements, described in greater detail hereunder.

Downstream of the conveyor 9 there are disposed two superposed conveyors 13A and 13B (shown both in the right part in FIGS. 1A, 2A and in the left part in FIGS. 1B, 2B) which receive the products fed from the conveyor 9. Downstream of the conveyors 13A, 13B a delivery conveyor 15 is arranged, which extends, with the various components of which it is formed, to a forming member 17 (FIG. 1B, 2B) in which, in a manner known per se, a tube is formed from a flat plastic film F unwound from a reel B and perforated by a perforator 24 according to transverse perforation lines.

The forming member 17 has a forming collar 19, around which the film F is fed and curved to form the tube and associated with which is a sealing member 21 which performs sealing of the longitudinal flaps of the film F to stabilize the tube inside which groups G of products R ordered in layers S coming from the conveyors upstream are inserted. The forming member 17 is also provided with a device 23 which, in a manner known per se, separates single lengths of tube formed by the film F, each of which wraps a respective group G of products ordered and fed inside and through the forming member 17.

Downstream of the forming member 17 an orienting conveyor 25 is arranged (FIGS. 1C, 2C), along which the single groups of ordered products inserted inside the respective lengths of plastic film tube are rotated through approximately 90° about a substantially vertical axis while they are fed along the feed path according to the direction of feed f, along which the entire packaging line extends.

Downstream of the orienting conveyor 25 is a corrector device 27, which corrects the angular and transverse position of each single group of products or rolls R coming from the orienting conveyor 25. Downstream of the corrector device 27 a folding station 29 is arranged (FIGS. 1D, 2D), of type known per se, followed by a station 31 for sealing the folded flaps of the pack of film that wraps the group G of packed products. The stations 29 and 31 have a conformation and a structure known per se, and will not be described herein. For example, the stations 29 and 31 can be designed as described in WO-A-2005/080206, the content of which forms an integral part of the present description and which can be referred to for further information on the methods of implementation of these two sections of the packaging line. It is important to point out that the stations 29 and 31 are arranged, contrary to those in conventional packaging lines, in line with the sections upstream, i.e. with the forming member and with the conveyors, which, in a manner described in greater detail hereunder, perform superposing of multiple layers of ordered products. Therefore, in substance, the entire packaging line extends according to a straight line in a plan view, said line coinciding with the direction of feed f of the products and consequently with the conformation of the feed path of the products along and through the various stations forming the packaging line.

Now describing the various sections or portions of which the line is composed in greater detail, the feed conveyor 5 comprises two lateral flexible members 101, for example two continuous lateral belts or two chains 101, driven around chain wheels or pulleys 103 (FIGS. 1A, 2A) with horizontal axes. The two belts 101 extend in two respective vertical planes and fixed thereto are crossmembers 105 forming pusher members for pushing single layers S each formed by an ordered arrangement of products R. The products R are pushed by the crossmembers 105 along a sliding surface 107, which is still part of the conveyor 5. The assembly formed by the pair of belts 101 and by the surface 107 oscillates according to the double arrow f5 about an axis, which is substantially horizontal and transverse with respect to the direction f of feed of the products R. In practice, the initial part of the conveyor remains at a fixed height, while the final or unloading part of the conveyor 5 (on the right in the drawing) is movable between two positions indicated with a solid line and with a broken line respectively. By taking the unloading end of the conveyor 5 to two distinct heights, said oscillating movement according to f5 allows the layers S of product R to be distributed alternately on one or other of the two conveyors 9 and 11 of the subsequent section 7.

The conveyor 9 has (FIGS. 1A, 2A and 5) a conformation substantially equivalent to that of the conveyor 5 described previously. It comprises a pair of continuous belts 113 driven around respective pulleys 115 with substantially horizontal axes. The belts 113 carry pushing members constituted by cross-members 117 which, analogous to the crossmembers 105 of the conveyor 5, push the layers S of products onto a sliding surface 119. As can be seen in particular in the side view (FIG. 1) the conveyor 9 oscillates according to the double arrow f9 to take the delivery end thereof to two different positions, i.e. to two different heights to unload the single layers of ordered products R on different levels. As mentioned above, the two conveyors 13A and 13B are disposed at these levels, downstream of the conveyor 9.

In practice, each of the conveyors 13A, 13B is constituted by a pair of belts 131 driven around pulleys 133 and between the belts 131 there are constrained crossmembers 135 acting as pushers. Each conveyor 13A, 13B has a respective sliding surface 137A, 137B. The two sliding surfaces 137A, 137B are disposed at two different heights or levels and the layers S of products R are made to slide therealong, as a result of the push exerted by the cross-members 135.

Contrary to the conveyors 5 and 9, the conveyors 13A, 13B do not oscillate. The two layers S which are fed to the two conveyors 13A, 13B are pushed by these in synchronism towards the delivery conveyor 15 so that, upon leaving the sliding surfaces 137A, 137B, the two layers of products located simultaneously on said surfaces are positioned one on top of the other on the delivery conveyor 15, the structure of which will be described in greater detail here under.

The conveyor 11 (FIGS. 1B, 2B, 5, 6) extends above the conveyor 9, and comprises, in the example shown, a plurality of conveyor belts described hereunder. In the first place, the conveyor 11 comprises a lower conveyor belt 141 driven around rollers 143 with substantially horizontal axes. Along the sides of the conveyor belt 141 two lateral retaining guides 145 are arranged, while the lower conveyor belt 141 forms a support for the layers S.

The belt 143 is followed by a further conveyor belt 149 driven around rollers 151 with substantially horizontal axes. The conveyor belt 149 extends in the main feed direction f.

Downstream of the horizontal conveyor belt 149 there is arranged a further conveyor belt 153, which is inclined and driven around rollers 155 with substantially horizontal axes.

The upper branch of the inclined conveyor belt 153 is aligned with an inclined surface 157 forming an extension of the inclined conveyor belt 153 and also part of the conveyor indicated as a whole with 11.

Above the inclined conveyor belt 153 and the inclined surface 157 there extend two continuous belts or continuous chains 159, which are driven around respective pulleys or chain wheels with horizontal axes 161. Between the belts or chains 159 there extend crossmembers 163 forming pushing elements for pushing the layers S of products R, which are located on the conveyor belt 153 or on the surface 157 forming the extension thereof. In substance, therefore, while in the first section of the conveyor 15 feed of the rolls R forming the layers S occurs as a result of the conveying movement by the horizontal conveyor belts 141 and 149, in the second section of the conveyor 11 feed occurs, analogous to the conveyors 5 and 9, by pushing by the crossmembers 163 constrained to the two belts 159. In the first section of the lower branch of the belts 159 the products R arranged in layers S are fed also as a result of the movement of the inclined conveyor belt 153, which allows the products transferred from the conveyor belt 159 upstream thereof to be fed beyond the point in which the crossmembers 163 can engage the layers S of product R from behind.

Figure 7:
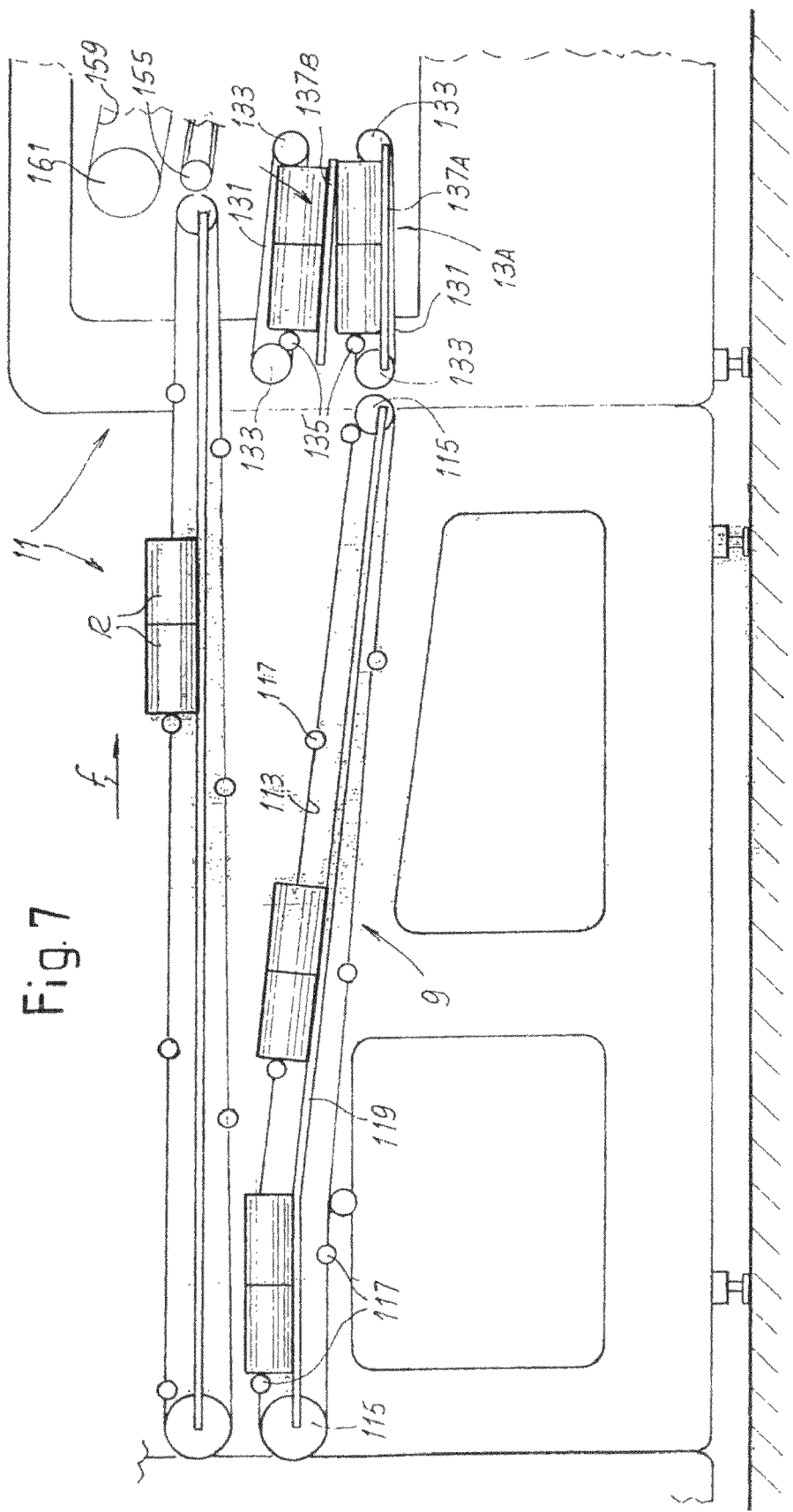
FIG. 7 shows an enlargement analogous to the one in FIG. 5 of a modified embodiment of a portion of the line.

Instead of the assembly of belts 141, 149, there can be provided a conveyor similar to the conveyor with belts or chains and crossmembers such as the one indicated with 101, 105 in section 5 of the line. A solution of this type is illustrated in the modified embodiment in FIG. 7, where the same numbers indicate elements identical or equivalent to those in the previously described figures.

The delivery conveyor, indicated as a whole with 15 and briefly mentioned above, is in actual fact in turn formed by a series of conveyor belts. In the first place the conveyor 15 comprises a horizontal lower conveyor belt 171 driven around rollers 173 with substantially horizontal axis. At the side and above the conveyor belt 171 there are disposed two superposed lateral conveyor belts 175. In the plan view the drive pulley 177 is also visible, associated with each lateral conveyor belt 175 to supply motion thereto. Reference number 179 indicates further idle pulleys of the lateral conveyor belts 175.

Above the initial section of the conveyor belt 171 and at a greater height with respect to the lateral conveyor belts 175 there is disposed a further horizontal conveyor belt 181 driven around rollers 183. Conversely, above the end part of the conveyor belt 171 and at a greater height with respect to the conveyor belts 175 a further horizontal conveyor 185 is arranged, which is driven around rollers 186 with substantially horizontal axes. Between the conveyor belt and the lateral conveyor belts 175 below a further conveyor belt 187 is arranged on each side of the conveyor 15. As can be seen in the plan view, each lateral conveyor belt 187 is driven around pulleys 189 and 191. These pulleys are coaxial with the corresponding pulleys 179. The conveyor belts 187 receive motion from pulleys, indicated again in the plan view with 177, coaxial with the pulleys that supply motion to the lateral conveyor belts 175 below. The upper horizontal conveyor belt 185 and the lateral conveyor belts 187 start in a position substantially coincident with the end of the inclined surface 157, along which the products R are pushed by the crossmembers 163 constrained to the aforesaid belts 159. The height at which the horizontal conveyor belts 185 and vertical conveyor belts 187 are located is also coincident with the height at which the products R are released by the inclined surface 157. This height is substantially equivalent to twice the height of a single layer S of products R, so that, as shown in the figure, the layer S pushed along the inclined surface 157; i.e. that is fed from the conveyor 11, is superposed on the two layers S previously released onto the conveyor 15 from the two inclined surfaces of the conveyors 13A, 13B. In substance, therefore, in the end section of the delivery conveyor 15, i.e. in the area in which the upper pair of conveyor belts 187 are disposed, there are three superposed layers S of products.

Downstream of the horizontal conveyor belts 185 and 171 further conveyor belts 193 and 195 are arranged, which are substantially parallel to each other, i.e. having opposite branches substantially parallel and disposed at the same height as the conveyor belts 185, 171 respectively. The lateral conveyor belts 175, 187 extend at the sides and between the horizontal conveyor belts 193, 195. In this way, in substance the compound conveyor 15 extends up to the inlet of the forming collar 19. This collar has a structure known per se and will therefore not be described in detail herein.

The sequence of FIG. 3A-3K shows how a group G of three layers S of products R is formed. This sequence, in which only some of the mechanical elements are shown and referred to, shows the movement of three layers of products R, indicated with S1, S2, and S3. It must be understood that in actual operation these three layers will be introduced in a substantially continuous flow of preceding and succeeding layers, to allow the line to work continuously and at high speed.

In FIG. 3A the three layers S1, S2, S3 are disposed on the feed conveyor 5 and are positioned at more or less even distances from one another. In FIG. 3B the conveyor 5 is oscillated downward, to unload the layers S1 and S2 onto the conveyor 9. In FIG. 3C the layers S1 and S2 are on the conveyor 9 while the layer S3 is still on the feed conveyor 5.

To unload the layer S3 onto the conveyor 11 above, the conveyor 5 oscillates upward (FIG. 3D). The oscillating movement takes place in very short times, during which feed of the layers S1, S2, S3 continues.

In FIG. 3E the layer S3 is on the conveyor 11 and is fed at a higher level with respect to the layers S1, S2.

FIG. 3F shows the step in which the layer S1 has been pushed onto the conveyor 13A, while the layer S2 is still on the conveyor 9 and the layer S3 on the conveyor 11. Rapid upward oscillation of the conveyor 9 takes the delivery end thereof to the height of the conveyor 13B, to allow the layer S2 to be pushed onto the sliding surface 137B of the upper conveyor 13B, while the layer S3 continues to be fed on the conveyor 11.

In FIG. 3H both layers S1 and S2 are on the superposed conveyors 13A and 13B respectively, while the layer S3 is on the conveyor 11 above, approximately above the layers S1 and S2.

Subsequently, the layers S1 and S2 are unloaded substantially simultaneously onto the conveyor belt 171 of the delivery conveyor 15, while the layer S3 starts to slide on the inclined surface 157 (FIG. 3I).

In FIG. 3J the layers S1, S2 and S3 are approximately superposed and are fed together on the belt 171 towards the forming collar 19, which they enter in a superposed arrangement (FIG. 3K).

It is understood from the sequence illustrated in FIGS. 3A-3K that forming of the group G of ordered products by superposing of single layers S takes place without the need to interrupt the flow of layers along the main feed direction, indicated with f. The conveyor 5 performs synchronization of the third layer S3 with respect to the layers S1, S2 below, accelerating or decelerating to ensure that it is superposed on the layers S1, S2 when these are fed on the delivery conveyor.

By simply deactivating the swinging movement of the first conveyor 5 it is possible, using the same device, to form groups G formed of only two layers of products, using the swinging conveyor 9 and maintaining the swinging conveyor 5 in the position indicated with a broken line in FIG. 1A. By stopping the swinging movement of the conveyor 9 and maintaining it in the position in FIG. 1A, groups G formed of a single layer can be formed.

It would also be possible to replace the conveyor 11 with a feed system comprising in turn a swinging conveyor similar to the conveyor 9, to form series of products comprising two layers, which are then fed synchronously with the series of two superposed layers formed by the conveyors 13A, 13B, to obtain groups G of four layers at the outlet.

According to a different embodiment of the invention, instead of providing two swinging conveyors 5 and 9 in series, it would also be possible to provide a single swinging conveyor that distributes the layers S on three (or more) distinct levels, at each of which there is a conveyor analogous to the conveyor 13A or 13B or equivalent feed system. The feed movement can be controlled so as to synchronize the movement of the single layers on the single levels, which are then unloaded on top of one another on the delivery conveyor. Stacking can take place, as in the case described, by superposing first two layers and then placing the third layer on top of this group of two layers.

Moreover, while a method and a device have been described in which a first set of two layers is formed on the lower level and a single layer is fed on the upper level and suitably synchronized to be subsequently superposed on the set of two layers below, it would also be possible to operate in the opposite way, forming a set of two or more layers on the upper level which is then superposed on a single layer below.

Downstream of the forming member 17 comprising the forming collar 19 and the other elements 21, 23 mentioned above, and the perforator 24 that perforates the film F along lines at which the tube formed by the forming collar 19 will be detached, i.e. severed by the device 23 to form single lengths wound around each group G of products R disposed in layers, there are arranged a pair of horizontal conveyors 201 that transfer each single group G of products R disposed in layers S towards an orienting conveyor 25, which will be described in greater detail hereunder.

At the inlet of the orienting conveyor 25 the groups G of products disposed in layers S are wrapped in the single lengths SP of plastic film wound tubularly so that the free ends L of these lengths project upstream and downstream (with respect to the direction f of feed) from the group G of ordered products. In the folding and sealing sections 29, 31, said side flaps must be disposed with a transverse alignment with respect to the direction of feed f, i.e. they must be facing the sides of the path followed by the groups of ordered products. The purpose of the orienting conveyor 25 is to rotate each single group G of products R through approximately 90° about an approximately vertical axis, to take the flaps L of the lengths SP of plastic film F from the position aligned along the direction f to the position aligned orthogonally to the direction of feed f.

For this purpose in the example shown the orienting conveyor 25 has a first series of lower continuous flexible elements 211, for example belts, defining a horizontal conveyor with the upper branch thereof. The belts 211 are driven around respective pulleys 213, 215, 217 with substantially horizontal axes, the pulleys 215, 217 defining the feed and delivery position of the orienting conveyor 25.

Between the pulleys 213, mounted idle on the respective axles, there is disposed a series of coaxial pulleys 219 mounted on a common motor axle, or on two common motor axles. In the plan view (FIG. 2C) the common axle or shaft is indicated with 221, and 223 indicates an electric motor that controls the rotational movement of the shaft 221 and therefore of the two pulleys 219 keyed thereon. A second motor 223X, indicated with a broken line, could be coupled with a second shaft 221X, again indicated with a broken line, in the event of the pulleys 219 being keyed onto two coaxial motor shafts 221, 221X and with two motors.

As can be seen in the plan view, the pulleys 219 have a gradually decreasing diameter starting from the first pulley (on the left of the production line observing it in the direction of feed f of the products) towards the right. This means that the belts or other flexible elements 211 have a different speed from one another and more specifically the belt 211 on the left (again observing it in the direction of feed f) has a higher feed speed with respect to the adjacent belt, and so forth, the belt 211 on the far right being the slowest.

As a consequence of this arrangement, each group G of products R ordered in layers and wound in a length SP of plastic film is subjected to a torque generated by the friction between the belts 211 and the outer surface of the plastic film of the length SP and caused by the gradually different speed in transverse direction of the belts 211. This causes a rotation of the group G of products as can be observed in the plan view in FIG. 2C and in the side view in FIG. 1C, in which there are simultaneously three groups G of products on the orienting conveyor 25: one in the feed area, still with the original orientation, one in an approximately intermediate position, rotated through 45°, and a third in proximity to the delivery area, rotated practically through 90° with respect to the initial position.

To improve this effect of rotation through 90° which is obtained during the feed movement along the path according to the direction of feed f of the groups G of products R, above the assembly of belts 211 is a second and symmetrical assembly of belts 212 or other continuous flexible elements. The belts 212 are guided and controlled in movement with an arrangement of pulleys symmetrical with respect to the arrangement of pulleys 213, 215, 217, 219 and with one or two motors equivalent to those indicated with 223 and 223X for the lower group of belts 211.

In this way, the two groups of belts 211, 212 exert a double twisting action on opposite horizontal faces of each group G of products wound in the respective length SP to obtain the desired rotation about the vertical axis through 90° of the group of ordered products.

As can be seen in FIGS. 1C, 2C, at the outlet of the orienting conveyor 25 the flaps L of the length SP of plastic film that wraps each group G of products R ordered in layers S are facing the sides of the packaging line, as required for subsequent folding and sealing of said flaps according to known techniques and with known means, not described.

The structure and the function of the corrector device 27 located down-stream of the orienting conveyor 25 is illustrated with reference to FIGS. 1C, 2C, 1D, 2D.

The device 27 is formed, in this embodiment, by two pairs of horizontal conveyor belts: an upper pair 231 and a lower pair 233 respectively. The number 235 indicates drive rollers of the two upper belts 231 and 237 indicates the drive rollers of the lower belts 233.

As can be observed in particular in the plan view, not only are the upper and lower belts double, but each of them is driven around a respective pair of rollers, so that the relative speed of one conveyor with respect to the other can vary for the purposes described hereunder.

A system for detecting the orientation of the single groups G of ordered products R is arranged at the inlet of the corrector device 27. In the example shown the detection system comprises two photocells 241 aligned in a direction orthogonal to the direction of feed f of the ordered in groups G of products R. These photocells are able to detect any angular positioning errors of the groups, i.e. are able to check if the groups G are not oriented (within certain admissible error margins) with the lateral surfaces thereof parallel to the direction of feed f. Any angular errors generate an error signal by the photocells 241, which triggers a correction process performed by the corrector device 27.

This correction process requires a difference in speed to be generated between the two conveyor belts of each pair of upper belts 231 and lower belts 233. It is understood that the difference in speed between the two belts on each level will be the same for the pair of upper belts 231 and for the pair of lower belts 233. This difference in speed acts on the group G of products R which is at that instant in the corrector device 27 similarly to the manner in which the belts 211 and the belts 212 cause rotation through 90° of the groups G. However, unlike these, the difference in speed is not fixed in advance by the geometry of the system, but is determined as a function of the reading taken by the detection system 241. Instead of photocells, this system can comprise a more complex viewing system, for example a still or video camera, or any other system, also not of an optical nature, which is able to detect any angular positioning errors of the single groups.

It would also be possible to integrate this function of correction in the orienting conveyor 25, positioning in the last area thereof a detection system of optical or of another kind, which influences the speed of the single belts 211, 212, although this implies a more complex construction due to the need to provide two or more motors for the belts 219 and also as a result of the fact that any correction made by varying the difference in speed between the belts 211, 212 influences the angular position not only of the last group G which is on the orienting conveyor 25, but also that of the groups G located upstream thereof. Alternatively, the orienting conveyor 25 can be made shorter and with a greater difference in speed between adjacent conveyor elements 211, or the single groups G can be disposed at a greater reciprocal distance, so that one group G is fed onto the orienting conveyor 25 when the previous group G has already been removed.

The correcting device 27 can be equipped with a further function for correction of the transverse position of the group G of products. For this purpose, the conveyor belts 231, 233 can be mounted on a support movable transversely according to the arrow fX, an actuator being provided to control movements in this direction fX as a function of any transverse positioning errors of the group G of products R ordered in layers S. Correction can be imposed by an optical detection system, such as a system with a still or video camera, or in any other suitable manner. The same detector can be used to detect angular positioning errors and transverse positioning errors of the groups G of products R.

At the outlet of the corrector device 27 the single groups G wrapped in the lengths SP of tubular film will thus be angularly and transversely positioned correctly to allow folding and sealing of the flaps L of film with known methods.

It must be understood that the corrector device 27 can also take different configurations with respect to that illustrated. For example, in a first modified embodiment, the upper conveyor belts 231 could be removed.

In a second modified embodiment (see FIG. 4) the corrector device 27 can comprise a continuous flexible member 251, for example formed by a pair of belts disposed on two parallel vertical planes, which carry one or more pushers in the form of blades 253. The arrangement is such that the blades 253 follow a closed path P1 along which a first section is identified parallel to a sliding surface 255, along which the blades 253 advance in the same direction as the direction f of feed of the products, and a second return section. This arrangement allows any angular errors to be corrected, as the push exerted by the blades 253 on the groups G of products R forces them to take a position with the face thereof in contact with the blades 253 parallel thereto, and the blades will be constrained to lie in a vertical plane orthogonal to the direction f of feed of the groups G of products. Correction of transverse positioning errors can for example take place by supplying a portion of the surface 255 with a transverse movement controlled in the same way as described with reference to the transverse movement of the conveyor belts 231, 233. In FIG. 4, 255A indicates a portion of said surface 255 which is provided with such translational movement. Downstream of the surface 255 a conveyor belt will be appropriately arranged to feed the groups G of products towards the stations 29 and 31.

Alternatively, the groups G of products can be fed on a conveyor belt at a certain speed and strike against a flat surface substantially orthogonal to the direction of feed, which moves at a lower speed with a substantially analogous effect of correcting the orientation.

It is understood that the drawing only shows an example provided by way of a practical demonstration of the invention, which can vary in forms and arrangements without however departing from the scope of the concept underlying the invention. Any reference numbers in the appended claims are provided to facilitate reading of the claims with reference to the description and to the drawing, and do not limit the scope of protection defined by the claims.

The invention claimed is:

1. Method for forming groups of products ordered according to a predetermined number of superposed layers, comprising:
    dividing a flow of products into single layers aligned with and spaced from one another on a first conveyor;
    feeding said single layers coming from said first conveyor on a plurality of conveyors superposed on one another at different levels, said different levels being of a number corresponding to a predetermined number of superposed layers to be provided in a group and said number being at least greater than two;
    superposing on one another said single layers coming from said different levels to provide a first set of superposed layers;
    advancing said first set of superposed layers along a principal direction of feed;
    while advancing said first set of superposed layers, superposing on each other said first set of superposed layers and a further set, including at least one of said single layers, to form a group of superposed products;
wherein said first conveyor and said plurality of conveyors superposed on one another feed said single layers along said principal direction of feed.

2. The method according to claim 1, further comprising placing the single layers of said first set one on top of another and advancing said first set along a lower conveyor in said principal direction of feed; while advancing said first set on said lower conveyor, advancing said further set along an upper conveyor arranged above said lower conveyor; and discharging said further set from said upper conveyor on top of said first set while advancing said first set and said further set in a feed direction along said lower conveyor.

3. The method according to claim 1, wherein movement of said first set and said further set is synchronized so as to superpose on each other said first set and said further set when such travel through a predetermined position along said principal direction of feed.

4. The method according to claim 3, wherein said first set and said further set are fed with substantially continuous motion through said predetermined position, with reciprocal superposing taking place with two layers moving in the principal direction of feed.

5. The method according to claim 1, wherein said predetermined number of superposed layers is equal to three.

6. The method according to claim 1, wherein said first set of superposed layers is formed at a level below that on which said further set is fed; said first set and said further set being fed according to said principal direction of feed along superposed paths; and said further set is positioned at a level above said first set in a position downstream of a position in which the first set is formed with respect to the principal direction of feed.

7. The method according to claim 1, wherein said single layers are spaced apart on said first conveyor at a substantially constant distance.

8. The method according to claim 1, wherein said single layers are distributed on said plurality of conveyors superposed on one another, and wherein said first conveyor and said plurality of conveyors are arranged to feed said single layers according to paths which, in a plan view, extend along a substantially rectilinear common trajectory.

9. The method according to claim 1, further comprising:
    feeding in sequence said single layers of products spaced from one another along said first conveyor;
    feeding a first series of said single layers to a first level and a second series of said single layers to a second level, said first level and said second level being substantially superposed on each other;
    feeding said first series and said second series along substantially superposed paths;
    dividing said first series into two sub-series of said single layers and feeding said two sub-series to two distinct levels substantially superposed on each other;
    positioning said two sub-series and said second series one above another to form said group of superposed layers.

10. The method according to claim 9, wherein along said principal direction of feed the two sub-series are superposed on each other and fed to a position in which the second series is superposed thereon.

11. The method according to claim 1, further comprising:
    feeding in sequence said single layers of products spaced from one another along said first conveyor, which is provided with a movement oscillating about a first substantially horizontal axis, to unload said first series onto a second conveyor and said second series onto a third conveyor, said second conveyor and said third conveyor being substantially superposed on each other and said second conveyor being oscillating about a second substantially horizontal axis by said second conveyor, unloading the layers of said first series onto a substantially superposed fourth conveyor and fifth conveyor;
    superposing on one another said layers of products coming from said third conveyor, said fourth conveyor and said fifth conveyor.

12. The method according to claim 11, wherein said fourth conveyor and said fifth conveyor are arranged at a lower height with respect to said third conveyor.

13. The method according to claim 1, wherein said group of superposed products is fed along a path substantially parallel to the principal direction of feed, along which said first conveyor and said second conveyor extend, towards a packaging station, and wherein said group is introduced into a forming collar to which a plastic film is fed, with which a tube is formed to wrap said group of superposed products, said tube having an axis substantially parallel to the principal direction of feed.

14. The method according to claim 1, wherein for each said group of superposed products there is defined on said first conveyor a sequence of substantially equidistant layers of products, in a number corresponding to the predetermined number of superposed layers forming said group; said sequence is divided between said different levels; the single layers disposed on said different levels are unloaded one on top of another to form said group of superposed products; and said single layers are unloaded one on top of another in succession as such are fed along said principal direction of feed.

15. A machine for forming ordered groups of products, each group of said groups of products comprising products disposed according to superposed layers, said machine comprising a succession of conveyors aligned according to a principal direction of feed, including a feed conveyor and a delivery conveyor, wherein the feed conveyor receives single layers of products aligned with and spaced from one another; and wherein said succession of conveyors are constructed and arranged so as to distribute said single layers of products on a predetermined number of levels at different heights, and to unload onto said delivery conveyor a predetermined number of said layers, superposed on one another, equal to the predetermined number of said levels at different heights; wherein between said feed conveyor and said delivery conveyor there is disposed a plurality of at least three conveyors at different levels corresponding to the number of superposed layers contained in each of said groups; and said conveyors are disposed to superpose on one another said single layers coming from different levels to provide a first set of layers; wherein said conveyors are further arranged to superpose on one another, said first set of layers and a further set of layers, while said first set and said further set are advancing along said principal direction of feed.

16. The machine according to claim 15, wherein a first oscillating conveyor is arranged between said feed conveyor and said delivery conveyor for distributing said single layers on an upper conveyor and on a lower conveyor arranged one above another and downstream of said first oscillating conveyor; and wherein said lower conveyor is a second oscillating conveyor for distributing said layers on further conveyors arranged one above another and under said upper conveyor and downstream of said lower conveyor.

17. The machine according to claim 15, wherein said feed conveyor, said delivery conveyor and said conveyors disposed between the feed conveyor and the delivery conveyor are constructed and arranged to form said first set of layers of products superposed on one another and said further set of layers, said first set of layers and said further set of layers being fed at levels superposed on each other, and to cause reciprocal superposing of said first set and said further set on said delivery conveyor, while said first set and said further set are fed along said principal direction of feed.

18. The machine according to claim 15, wherein said feed conveyor, which receives and feeds said single layers of products spaced from one another, is a first conveyor structured to oscillate about a first substantially horizontal axis; disposed downstream of said first conveyor is a second conveyor and a third conveyor, substantially superposed on each other and aligned with said first conveyor along said principal direction of feed; said second conveyor and said third conveyor are constructed and arranged, with respect to said first conveyor, so as to alternately receive the layers of products fed from said first conveyor as a result of oscillating movement thereof about said first substantially horizontal axis; said second conveyor is structured to oscillate about a second substantially horizontal axis; downstream of said second conveyor is arranged a fourth conveyor and a fifth conveyor, substantially superposed on each other and aligned with said second conveyor along said principal direction of feed; said fourth conveyor and said fifth conveyor are arranged with respect to said second conveyor so as to alternately receive products distributed by said second conveyor as a result of oscillating movement thereof about said second substantially horizontal axis; and said third conveyor, said fourth conveyor and said fifth conveyor are arranged to unload said layers of products superposed on one another onto said delivery conveyor.

19. The machine according to claim 18, wherein said third conveyor extends above said fourth conveyor and said fifth conveyor.

20. The machine according to claim 19, wherein said third conveyor extends partially above said delivery conveyor, so that the layers of products coming from said fourth conveyor and said fifth conveyor are unloaded superposed on one another onto said delivery conveyor, and a third layer coming from said third conveyor is superposed on each pair of superposed layers coming from said fourth conveyor and said fifth conveyor.

* * * * *